United States Patent
Metten et al.

(10) Patent No.: US 9,771,962 B2
(45) Date of Patent: Sep. 26, 2017

(54) FASTENING ARRANGEMENT WITH TOLERANCE COMPENSATION, AND METHOD FOR PRE-ASSEMBLY AND ASSEMBLY

(71) Applicant: BÖLLHOFF VERBINDUNGSTECHNIK GMBH, Bielefeld (DE)

(72) Inventors: Andreas Metten, Versmold (DE); Hans-Ulrich Figge, Schloβ Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 361 days.

(21) Appl. No.: 14/390,612

(22) PCT Filed: Apr. 2, 2013

(86) PCT No.: PCT/EP2013/056916
§ 371 (c)(1),
(2) Date: Oct. 3, 2014

(87) PCT Pub. No.: WO2013/150016
PCT Pub. Date: Oct. 10, 2013

(65) Prior Publication Data
US 2015/0139749 A1    May 21, 2015

(30) Foreign Application Priority Data
Apr. 3, 2012 (DE) .......................... 10 2012 102 906

(51) Int. Cl.
*F16B 43/02* (2006.01)
*F16B 5/02* (2006.01)
(Continued)

(52) U.S. Cl.
CPC ............ *F16B 5/025* (2013.01); *F16B 5/0233* (2013.01); *F16B 5/0283* (2013.01); *F16B 31/02* (2013.01);
(Continued)

(58) Field of Classification Search
CPC ...... F16B 5/025; F16B 5/0233; F16B 5/0283; F16B 39/32
(Continued)

(56) References Cited

U.S. PATENT DOCUMENTS 5,573,311 A * 11/1996 Clohessy ................ F16B 39/32
                                                           301/105.1
6,543,956 B2    4/2003 Schwarzbich
(Continued)

FOREIGN PATENT DOCUMENTS

CN     101135331 A     3/2008
CN     101324246 A    12/2008
(Continued)

OTHER PUBLICATIONS

Translation of the International Search Report for application No. PCT/EP2013/056916, dated Aug. 8, 2013, 3 pages.
(Continued)

*Primary Examiner* — Gary Estremsky
(74) *Attorney, Agent, or Firm* — Reising Ethington P.C.

(57) ABSTRACT

The present invention relates to a fastening arrangement for fastening a component A to a component B with automatic tolerance compensation between the components A and B. The fastening arrangement comprises a fixable base element into which a mounting screw can be screwed via a first thread pair, and an adjusting element with an external thread that can be screwed into the base element via a second thread pair, wherein a first and a second anti-rotation safeguard are provided between the base element and the adjusting ele-
(Continued)

Figure 1:
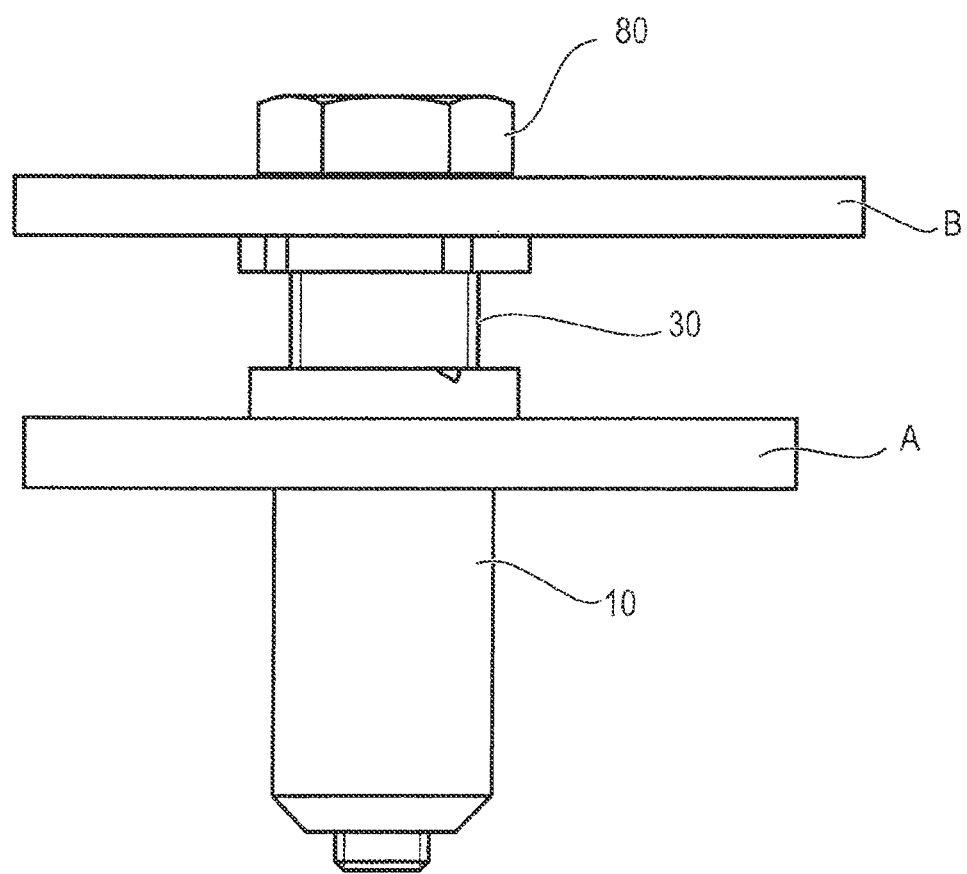

ment, wherein said anti-rotation safeguards can be used to prevent detachment of the adjusting element from the base element during transport as well as locking of the adjusting element with the base element.

17 Claims, 10 Drawing Sheets

(51) Int. Cl.
F16B 39/32 (2006.01)
F16B 41/00 (2006.01)
F16B 31/02 (2006.01)

(52) U.S. Cl.
CPC .............. *F16B 39/32* (2013.01); *F16B 41/00* (2013.01); *F16B 41/002* (2013.01); *Y10T 29/49881* (2015.01)

(58) Field of Classification Search
USPC ......................................................... 411/546
See application file for complete search history.

(56) References Cited

U.S. PATENT DOCUMENTS

| 7,891,927 | B2 | 2/2011 | Burger et al. | |
|---|---|---|---|---|
| 8,066,465 | B2 | 11/2011 | Figge et al. | |
| 8,240,966 | B2 | 8/2012 | Figge et al. | |
| 2005/0047893 | A1* | 3/2005 | Schwarzbich | F16B 5/0233 411/546 |
| 2006/0226312 | A1* | 10/2006 | Masuch | F16B 37/041 248/188 |
| 2006/0280579 | A1* | 12/2006 | Seidl | F16B 5/025 411/546 |
| 2007/0009342 | A1* | 1/2007 | Figge | F16B 5/0233 411/546 |
| 2007/0092355 | A1* | 4/2007 | Burger | F16B 5/0233 411/535 |
| 2008/0038090 | A1* | 2/2008 | Figge | F16B 5/025 411/433 |
| 2008/0304907 | A1* | 12/2008 | Figge | F16B 5/0233 403/408.1 |
| 2009/0067921 | A1* | 3/2009 | Ito | F16B 5/0283 403/408.1 |
| 2012/0090146 | A1 | 4/2012 | Figge et al. | |

FOREIGN PATENT DOCUMENTS

| CN | 102138011 A | 7/2011 |
|---|---|---|
| DE | 10300991 A1 | 7/2004 |
| DE | 202005010873 U1 | 9/2005 |
| DE | 202006012493 U1 | 11/2006 |
| DE | 202007008154 U1 | 9/2007 |
| DE | 202008011318 U1 | 11/2008 |
| DE | 102010020198 A1 | 11/2011 |
| EP | 1180605 A1 | 2/2002 |
| EP | 1780424 A1 | 5/2007 |
| EP | 2003346 A2 | 12/2008 |
| EP | 2428688 A1 | 3/2012 |

OTHER PUBLICATIONS

Written Opinion for application No. PCT/EP2013/056916, dated Aug. 8, 2013, 6 pages.
English translation of the International Preliminary Report on Patentability for PCT/EP2013/056916 dated Oct. 16, 2014, 9 pages.
CN Office Action for CN Application No. 2013800188724 dated Jul. 5, 2015 (8 pages).

* cited by examiner

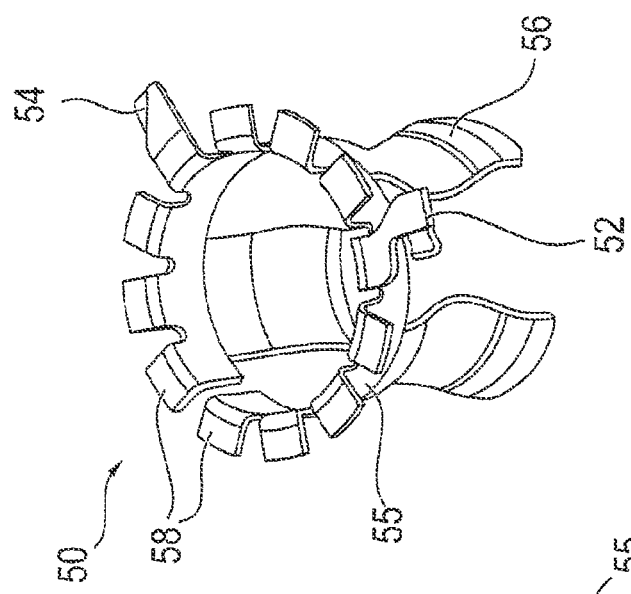
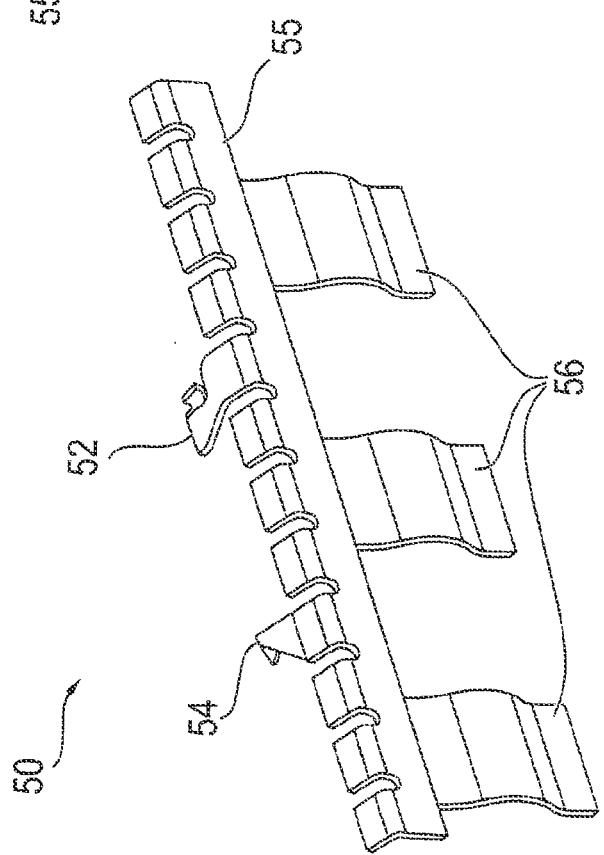
FIG. 12
FIG. 11

FASTENING ARRANGEMENT WITH TOLERANCE COMPENSATION, AND METHOD FOR PRE-ASSEMBLY AND ASSEMBLY

1. FIELD OF THE INVENTION

The present invention relates to a fastening arrangement for fastening a component B at a component A with automatic tolerance compensation between the components A and B. Further, the present application relates to a method for pre-assembly of this fastening arrangement as well as a method for assembly of this fastening arrangement.

2. BACKGROUND OF THE INVENTION

In the prior art, different constructions of fastening arrangements for fastening a component to another component with automatic tolerance compensation between these components are known. Such fastening arrangements consist principally of a basic element fixed at the first component. For this purpose, the basic element is for example screwed into the first component, jammed there and thus fixed detachable or non-detachable. With the basic element, an adjusting element may be screwed-in via a thread pairing. This adjusting element is screwed out of the basic element to compensate tolerances between components which are arranged adjacent to each other in case a fastening screw connecting the components is screwed into the basic element via a further thread pairing. Such constructions are generally known and for example described in the European patent applications 1 780 424 A1 and 2 003 346 A2.

In the mentioned fastening arrangements of the prior art, it is recognizable that the basic element is for example screwed into the first component or is locked there in a respective opening.

The components of the mentioned fastening arrangements are produced each as one piece from plastic which requires a large installation space due to the construction. Further, the usage of plastics for producing the fastening arrangement may come along with disadvantages concerning the stability, integrity and usability of the fastening arrangement in chemical aggressive media or in a thermally burdened surrounding. It is thus desirable to provide a compact fastening arrangement with smaller installation space or space requirements and high durability in the most different fields of application.

The above mentioned fastening arrangements have a releasable transport safeguard arranged between the adjusting element and the basic elements so that the adjusting element and the basic element are attached to each other against twisting during a transport of the fastening arrangement. In this manner, such a transport safeguard ensures that the adjusting element does not release itself from the basic element and the fastening arrangement arrives incomplete at its final destination, as a consequence. Such a transport safeguard consists for example of a springy web engaging an oppositely arranged recess. In this manner, the transport safeguard can be made catchingly and is undoable. At the pre-assembly of known fastening arrangements it has shown, however, that despite of the transport safeguard the adjusting element was fixable at the basic element so tightly that a releasing of the adjusting element from the basic element was only possible with high effort or not at all. This complicates, however, the installation of the fastening arrangement between the two components and is time consuming, which has a negative influence on an effective installation procedure of the fastening arrangement.

It is thus an object of the present invention to provide a fastening arrangement which ensures a time-saving and reliable installation between two components. It is a further object of the present invention to provide a method for pre-assembly and a method for assembly of such a fastening arrangement.

3. SUMMARY OF THE INVENTION

The above object is solved by a fastening arrangement according to claim 1, a method for pre-assembly of the fastening arrangement according to claim 13 and a method for assembly of the fastening arrangement according to claim 14. Preferred embodiments and developments of the present invention result from the dependent claims, the description and the accompanying drawings.

The fastening arrangement according to the invention for fastening a component B at a component A with automatic tolerance compensation between the components A and B comprises the following features: a basic element fixable at component A, wherein a fastening screw is screwable into the basic element via a first thread pairing, an adjusting element having an external thread, which is screwable into the basic element via a second thread pairing, wherein a first and a second anti-twist protection are provided between the basic element and the adjusting element by means of which a respective releasing of the adjusting element from the basic element during a transport and a locking of the adjusting element with the basic element is prevented. The above mentioned thread pairings have opposite thread directions with respect to each other.

The fastening arrangement according to the invention is characterized by its compact construction which requires less installation space compared to the known fastening arrangement. For ensuring this compact construction while simultaneously maintaining the required stability of the fastening arrangement, preferably metal is used for producing the fastening arrangement. Corresponding to the functionality of the individual components of the fastening arrangement, it is preferred to use different metals for the individual components.

Further, the fastening arrangement according to the invention is provided with a first and a second anti-twist protection between the adjusting element and the basic element. The first anti-twist protection represents a transport safeguard or protection provided by a releasable locking connection between the basic element and the adjusting element. The second anti-twist protection safeguards the fastening arrangement against a locking of the basic element and the adjusting element, meaning that the second anti-twist protection prevents a screwing-in of the adjusting element into the basic element which is too tight. To this end, the second anti-twist protection blocks at a specific angle position between the adjusting element and the basic element a further screwing-in of the adjusting element into the basic element. By means of these combined first and second anti-twist protections, the safe and related transport of the fastening arrangement consisting of the basic element and the adjusting element is ensured as well as an efficient assembling of the fastening arrangement between the components A and B. The first and the second anti-twist protections are realized in different constructive ways. According to different preferred embodiments of the invention, which will be explained in detail below, they are realized in elements which are separated from each other or commonly in only one element.

According to a preferred embodiment, the first anti-twist protection which is also referred to as transport safeguard, is a web arranged springy in axial direction of the adjusting element by means of which a locking connection lockable and releasable by rotation is creatable between the adjusting element and the basic element. The transport safeguard protrudes in radial direction beyond at least a part of the adjusting element so that a springy movement of the adjusting element in axial direction is ensured. In a preferred embodiment of the present invention, the anti-twist protection consists of a spring arm extending in tangential direction with respect to the adjusting element. This spring arm is fixed at the adjusting element on one side or on both sides and comprises a recess formed in the direction of the basic element cooperating with a respective recess in the basic element. As soon as the adjusting element is screwed sufficiently deep into the basic element, the first anti-twist protection locks springy into the respective recess at the basic element to provide the already above mentioned transport safeguard.

According to a further embodiment of the present invention, the second anti-twist protection, also denoted as lock safeguard or protection, is a web protruding in radial direction of the adjusting element which is preferably arranged inclined in the direction of the basic element and which blocks a further screwing-in of the adjusting element into the basic element. This web is preferably provided separately from the transport safeguard. It is also preferred to integrate the lock safeguard into the web of the transport safeguard.

The second anti-twist protection is formed preferably compact, stable and not springy due to its functionality. In this way, the second anti-twist protection constitutes a blocking which blocks the rotational movement of the adjusting element against a further screwing-in of the adjusting element into the basic element. For this purpose, preferably the radially protruding web of the second anti-twist protection engages a recess at the basic element adapted thereto which prevents an over-screwing of this blocking connection due to the non-springy construction of the second anti-twist protection and the adapted shape of the recess in the basic element. In this context, it is preferred that the radially protruding web of the second anti-twist protection or lock safeguard has an upsetting or compression surface oriented almost radial with respect to the adjusting element by means of which a surface of at least one recess at the basic element may be abutted. For defining the orientation of the mentioned compression surface, the surface normal arranged on the compression surface is viewed, which is aligned according to the invention preferably in tangential direction with respect to the adjusting element. Preferably, the compression surface of the second anti-twist protection or lock safeguard cooperates with a surface in the recess at the basic element which is arranged parallel or almost parallel thereto. The surfaces adapted in this manner in their orientation with respect to each other ensure that a torque applied to the adjusting element is directed into the basic element to prevent a further screwing-in of the adjusting element into the basic element. According to an embodiment of the present invention, the surface normal of the compression surface is arranged in an angle smaller 90° with respect to the longitudinal axis of the adjusting element and thus arranged inclined in the screw-in direction into the basic element. In this way, it is ensured that the compression surface is aligned almost parallel to the contact surface in the recess.

According to a further preferred embodiment, the basic element comprises at a front surface facing the adjusting element at least one, further preferred at least two, recesses spaced from each other, preferably for 120°, which are engageable by the first and the second anti-twist protection of the adjusting element at the same time. It is also conceivable to arrange these recess at the basic element in a larger or smaller angular distance with respect to each other as long as the functionality of the first anti-twist protection and of the second anti-twist protection is guaranteed at the same time. According to a further embodiment, only one recess is provided at the basic element which cooperates with the transport safeguard as well as with the lock safeguard due to its shape. For this purpose, the at least one recess preferably comprises a first and/or a second surface respectively, which are arranged angularly and non-symmetrically with respect to each other. Certainly, it is also preferred in the same manner to use surfaces for the recesses at the basic element which are arranged symmetrically with respect to each other. However, preferably at least one of the surfaces of the recess which are oriented angularly with respect to each other is adapted to the orientation of the compression surface of the second anti-twist protection or lock safeguard so that this second surface of the recess as well as the compression surface are aligned parallel or almost parallel with respect to each other. Therefore, and according to a preferred embodiment, the first surface of the recess is arranged in a larger angle as the second surface of the recess with respect to the longitudinal axis of the basic element. According to a further preferred embodiment, the at least one recess extends over a specific rotation angle range. The two ends of the recess which are spaced with respect to each other in circumferential direction cooperate with the transport safeguard and the lock safeguard.

With respect to the construction of the fastening arrangement, the adjusting element consists preferably of a multi-part construction having a central dragging-safeguard-component. For providing a space-saving construction of the fastening arrangement, the central dragging-safeguard-component comprises at least one radially inwardly protruding dragging arm as well as the radially outwardly protruding first and second anti-twist protections. The central dragging-safeguard-component is constructed so that the at least one dragging arm is arranged radially inside and the anti-twist protection radially outside of the sleeve shaped adjusting element. By means of this central dragging-safeguard-component, preferably the production of the adjusting element is simplified and the number of individual parts of the adjusting element is reduced.

The adjusting element preferably comprises also a threaded sleeve and a disc, wherein the dragging-safeguard-component is fixed between the disc and the threaded sleeve by means of a fastening sleeve. It is also preferred to provide the above described adjusting element as one piece or multi-part injection molding component or in general as plastic component.

The present invention comprises further a connection between component A and component B which has been produced by means of the above described fastening arrangement in combination with a fastening screw.

Such a connection is realized by a method for assembly of the fastening arrangement comprising the following steps: fixing the basic element at component A, screwing-in of the fastening screw through an opening in component B and through the adjusting element installed in the basic element into the basic element so that tolerances between the components A and B are compensated automatically and wherein a releasing of at least the first anti-twist protection takes place between the basic element and the adjusting element and screwing the fastening screw tightly into the basic element so that the components A and B are fixed to each other.

For ensuring an effective installation of the fastening arrangement between the components A and B, the fastening arrangement is first pre-assembled before distribution. This method for pre-assembly of the fastening arrangement comprises the following steps: screwing-in of the adjusting element into the basic element, locking of the first anti-twist protection of the adjusting element in a first recess at the basic element and blocking of the second anti-twist protection of the adjusting element in a second recess at the basic element so that a locking of the adjusting element and the basic element is prevented. In this way, and preferably according to the invention, the adjusting element is screwed sufficiently deep into the basic element so that an installation between the components A and B is prepared. At the same time, it is also prevented that the adjusting element has been locked with the basic element during the pre-assembly which would guarantee a lose-proof transport of the adjusting element in the basic element but would require additional time for releasing the connection between the adjusting element and the basic element during assembly of the fastening arrangement between the components A and B. As a consequence, the method for pre-assembly prepares an effective and time-saving installation of the fastening arrangement between the components A and B.

4. SHORT DESCRIPTION OF THE ACCOMPANYING DRAWINGS

Figure 2:
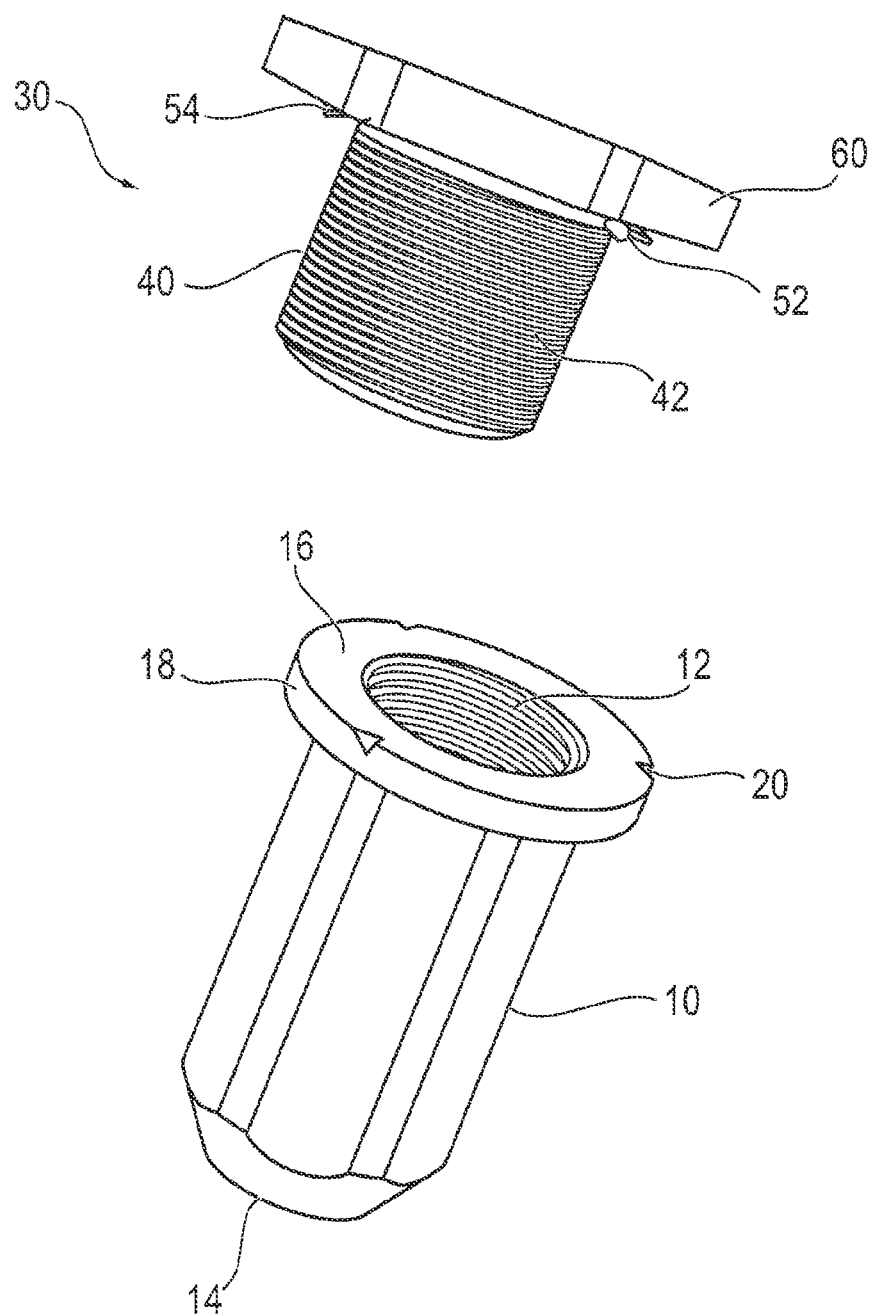
Figure 3:
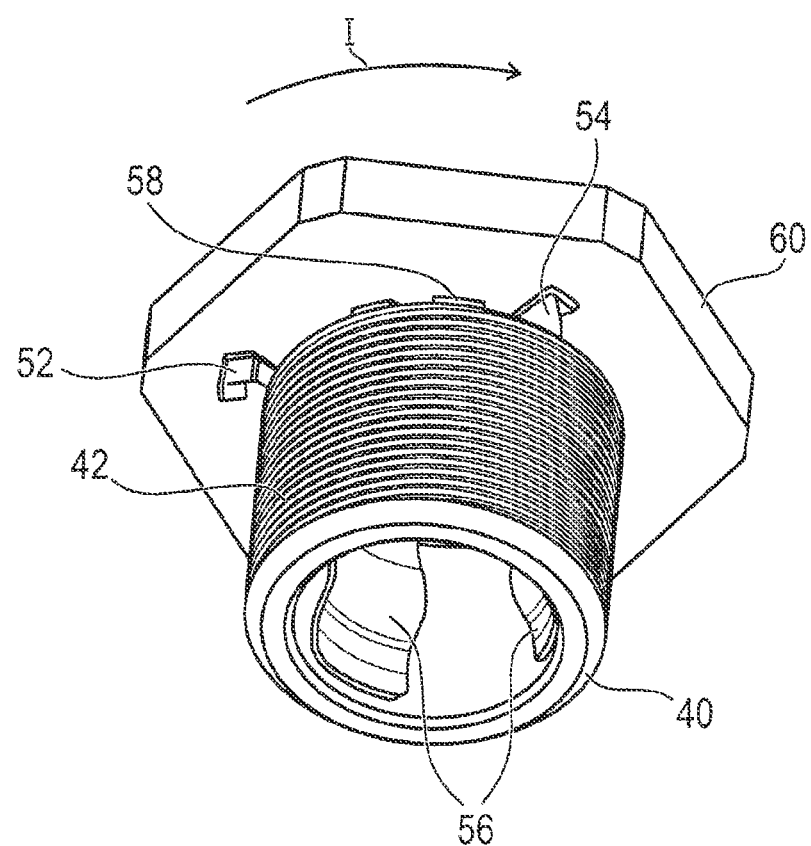
Figure 5:
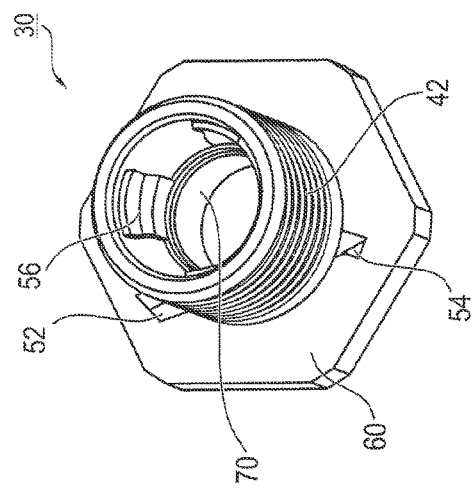
Figure 4:
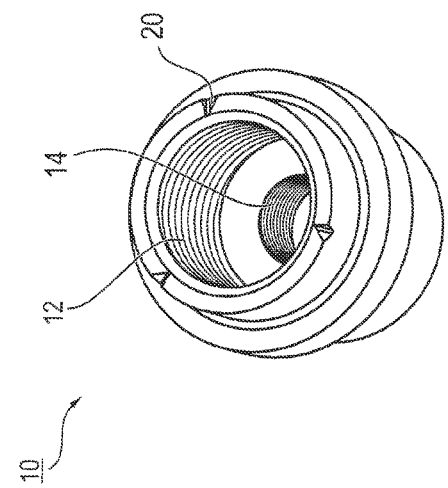
Figure 6:
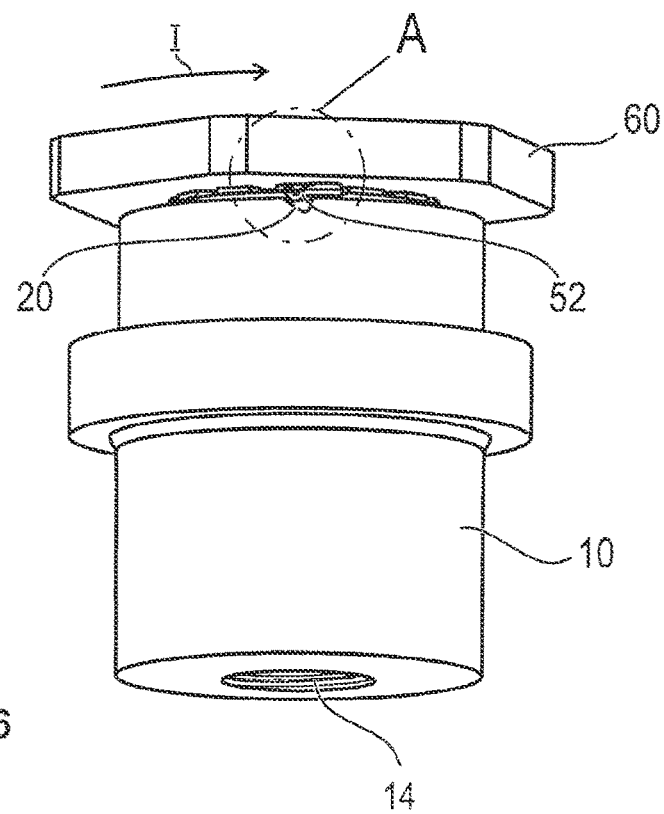
Figure 7:
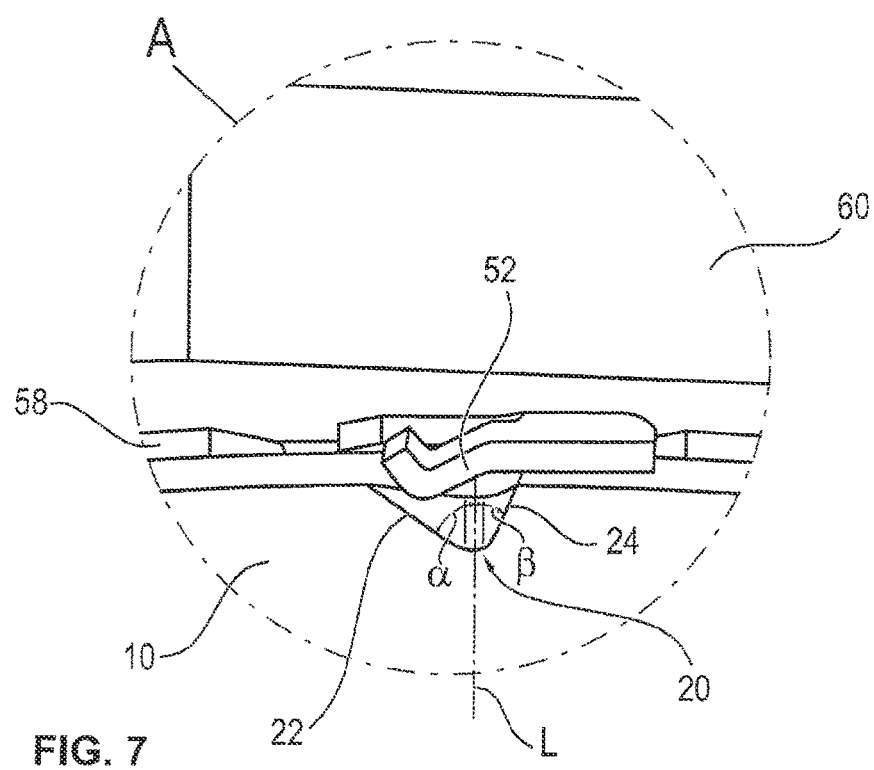
Figure 8:
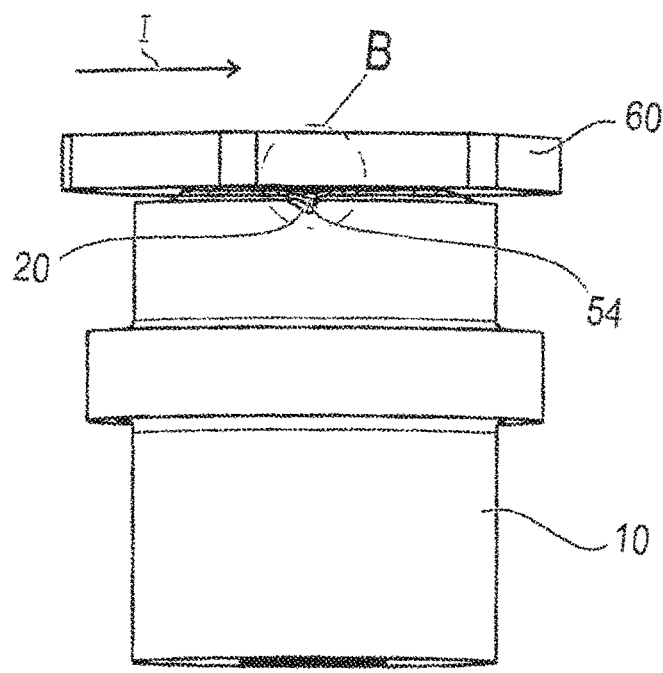
Figure 9:
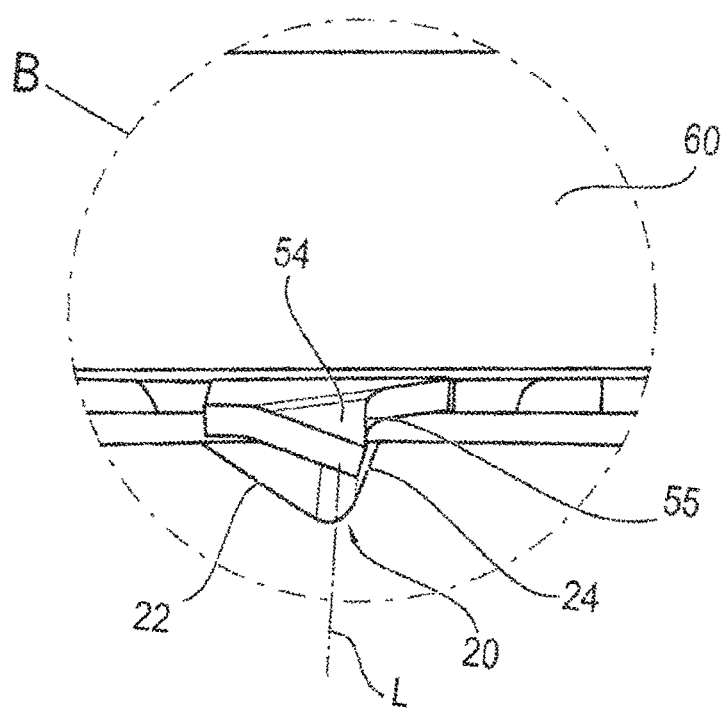
Figure 10:
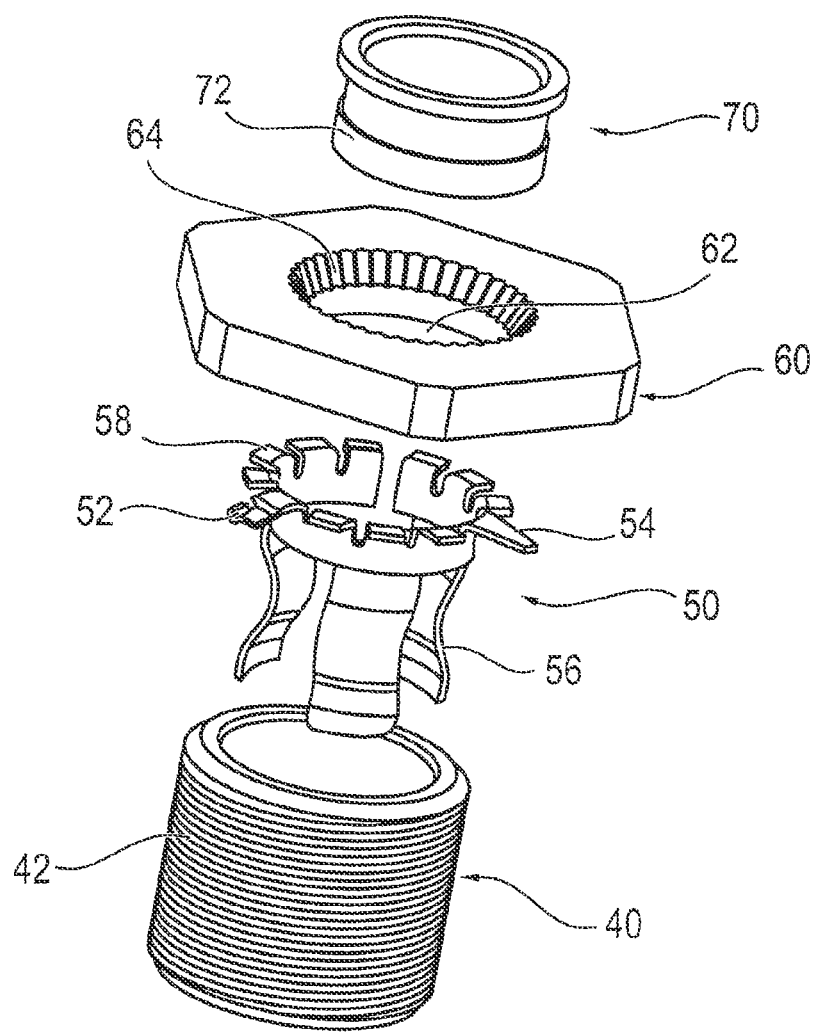
Figure 13:
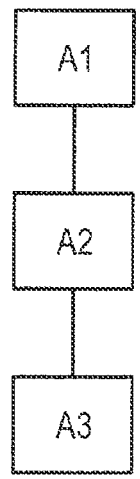
Figure 14:
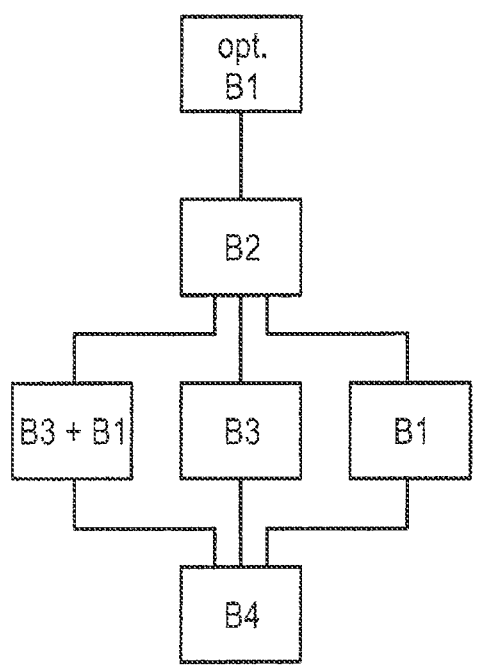

The preferred embodiments of the present invention will now be described in detail with reference to the accompanying drawings. It shows:

FIG. 1 a preferred embodiment of the assembled fastening arrangement between the two components A and B, FIG. 2 an exploded view of a preferred embodiment of the fastening arrangement consisting of basic element and adjusting element, FIG. 3 a preferred embodiment of the adjusting element, FIG. 4 a perspective view of a preferred embodiment of the basic element, FIG. 5 a perspective view of a preferred embodiment of the adjusting element, FIG. 6 a perspective view of a preferred embodiment of the fastening arrangement having a first anti-twist protection, FIG. 7 an detail enlargement of FIG. 6, FIG. 8 a perspective view of a preferred embodiment of the fastening arrangement having a second anti-twist protection, FIG. 9 a detail enlargement of FIG. 8, FIG. 10 an exploded view of the preferred embodiment of the adjusting element, FIG. 11 a preferred embodiment of the dragging-safeguard-component in strip shape, FIG. 12 a perspective view of the preferred embodiment of the dragging-safeguard-component in ring shape, FIG. 13 a preferred embodiment of a method for pre-assembling the fastening arrangement, and FIG. 14 a preferred embodiment of the method for assembling the fastening arrangement.

5. DETAILED DESCRIPTION OF THE PREFERRED EMBODIMENTS

FIG. 1 shows a preferred embodiment of the fastening arrangement according to the invention for fastening a component B at a component A with automatic tolerance compensation between the components A and B. The fastening arrangement comprises therefore a basic element 10 which is fixed in an opening of the component A. An adjusting element 30 is connected to the basic element 10 via a screw connection. According to the rotational direction of the adjusting element 30, the common axial length of the basic element 10 and the adjusting element 30 varies, whereby tolerances between the two adjacent components A, B are compensable.

In the assembled state of the fastening arrangement, the adjusting element 30 supports itself at the second component B. The components A and B as well as the fastening arrangement 10, 30 are connected to each other via a mounting screw or fastening screw 80. Therefore, the fastening screw 80 is screwed into a threaded portion 14 in the basic element 10 (see below).

While the basic element 10 consists of plastic or metal, it is preferred to make the basic element 10 from steel. This material choice ensures a sufficient stability, resistance with respect to chemical, mechanical and thermal aggressive media and ensures further a reliable fastening within component A. Preferably, the basic element 10 is realized as locking nut, welding nut or blind rivet nut. It is further preferred to fix the basic element 10 as nut having an external thread within the component A. According to a further alternative, the basic element 10 is glued into the opening of the component A.

As can be seen from FIGS. 2 and 6, the basic element 10 comprises an internal thread portion 14 having a first thread direction cooperating with the thread of the fastening screw 80. Adjacent to the threaded portion 14, the inner side of the basic element 10 comprises an internal thread 12 having a second thread direction opposite to the first thread direction. The internal thread 12 cooperates with an external thread 42 of a sleeve 40 of the adjusting element 30. Therefrom it follows that at the screwing-in of the fastening screw 80 into the thread portion 14 the adjusting element 30 is screwed out of the basic element 10 via the second thread pairing. A rotation of the adjusting element 30 together with the fastening screw 80 is realized by means of at least one dragger 56 which makes a frictional connection between the adjusting element 30 and the fastening screw 80.

The basic element 10 comprises at its end facing the adjusting element 30 a front surface 16. Preferably, a plurality of recesses 20 is formed at this front surface 16, preferably at least two notches which are offset with respect to each other for 120°. According to a preferred embodiment, a circumferential flange 18 provides the front surface 16 at which three notches 20 are provided which are equally spaced from each other. It is also preferred to form the notches 20 without circumferential flange 18 at the front surface 16 of the basic element 10.

According to a further preferred embodiment (not shown) only one recess 20 is provided in which the first and the second anti-twist protection (see below) take effect. For this purpose, for example this recess 20 extends over a specific rotation angle range to ensure a safe engagement of the first and the second anti-twist protection in this recess, even with clearance. According to a further preferred embodiment of the present invention, an arbitrary number of recesses 20 are provided which are spaced from each other equally or non-equally. This plurality of recesses 20 is preferably arranged so that the first and the second anti-twist protection (see below) engage the recesses 20 simultaneously or with a timely offset with respect to each other.

These notches 20 cooperate with the first and the second anti-twist protection 52, 54 which serve as transport safeguard 52 of the adjusting element 30 in the basic element 10 and as lock safeguard 54 between the basic element 10 and the adjusting element 30 (see below).

According to FIGS. 2, 3 and 10, the adjusting element 30 consists preferably of a threaded sleeve 40 which is connected to a disc 60 via a pressed sleeve 70 and a dragging-safeguard-component 50. The threaded sleeve 40 has an external thread 42 cooperating with the internal thread 12 of the basic element 10. As already mentioned above, the internal thread 12 and the external thread 42 have the second thread direction which is opposite to the thread direction of the first thread pairing between the fastening screw 80 and the thread portion 12. The adjusting element 30 supports itself at the component B via the disc 60, as illustrated in FIG. 1. The disc 60 and the threaded sleeve 40 consist of metal, preferably steel, wherein application-oriented also other metals or plastics are usable. Although a multi-part construction is preferred here, the adjusting element 30 may also be provided as one-piece plastic component.

According to FIG. 10, the disc comprises an inner opening 62 having a chamfered portion 64. Preferably, the chamfered portion is formed knurled so that the interference fit of the pressed sleeve 70 within the opening 62 is supported. The pressed sleeve 70 comprises also a circumferential, preferably structured, portion 72 supporting a frictional connection between the pressed sleeve 70, dragging-safeguard-component 50 and threaded sleeve 40. The pressed sleeve 70 is forced into the threaded sleeve 40 in axial direction through the opening 62 and through the preferably torus shaped curved dragging-safeguard-component 50 and is fixed there by frictional connection. In this manner, the disc 60, the dragging-safeguard-component 50 and the threaded sleeve 40 are connected to each other reliably and form the adjusting element 30.

The dragging-safeguard-component 50 preferably consists of a springy material as for example spring steel to ensure the functionality of the dragging arms 56 (see below). In this context, it is preferred to manufacture the dragging-safeguard-component 50 as punched and bended part. Alternatively thereto, all other springy materials are usable.

In FIGS. 3 and 5, the following details are visible: the at least one dragging arm 56 in the inside of the adjusting element 30, the pressed sleeve 70 as well as the two anti-twist protections 52, 54. Both anti-twist protections 52, 54 serve as transport safeguard 52 for the fastening of the basic element 10 and the adjusting element 30 to each other and as lock safeguard 54 for preventing a hard or not releasable screwing-in of the adjusting element 30 into the basic element 10. As part of the dragging-safeguard-component 50, the transport safeguard 52 and the lock safeguard 54 project beyond the radial outer edge of the threaded sleeve 40 between the threaded sleeve 40 and the disc 60 (cf. FIGS. 6, 7 and 8, 9).

Preferably, the transport safeguard 52 and the lock safeguard 54 are spaced from each other by an angle of around 120°, wherein the lock safeguard 54 is located upstream of the transport safeguard 52 viewed in the screw-in direction I of the adjusting element 30 into the basic element 10. The transport safeguard 52 and the lock safeguard 54 may preferably also be arranged spaced in an angle larger or smaller as 120° with respect to each other. It is also preferred to realize the transport safeguard 52 and the lock safeguard 54 in only one radial protruding element of the adjusting element 30 to support a compact design or structure.

The transport safeguard 52 and the lock safeguard 54 cooperate with the at least one recess or notch 20 (see above), which are spaced from each other according to the angular distance of the transport safeguard and the lock safeguard 54 to ensure the simultaneous engagement of the transport safeguard 52 and the lock safeguard 54 each in one or in a common notch 20. It is also preferred that the transport safeguard 52 and the lock safeguard 54 engage in recesses 20 which are spatially displaced with respect to each other. This engagement occurs simultaneously or with offset from each other.

According to a preferred embodiment shown in FIGS. 7 and 9, the notches 20 consist of two surfaces 22, 24 arranged angularly to each other. According to an embodiment of the present invention, these surfaces 22, 24 are formed and arranged non-symmetrically to each other, wherein also a symmetrical arrangement of the surfaces 22, 24 may be used.

According to an embodiment of the present invention, the surface 24 of the notch 20 which is located upstream in screw-in direction I is arranged in a smaller angle β with respect to the longitudinal axis L of the basic element 10 compared to the surface 22, which is arranged in the angle α with respect to the longitudinal axis L of the basic element 10. This alignment of the surface 22 supports a releasing of the transport safeguard 52 during assembly of the fastening arrangement between the components A and B.

Further, the surface 24 which is arranged steeper with respect to the longitudinal axis L of the basic element 10 provides a blocking plane for the lock safeguard 54 (cf. FIG. 9). It is also preferred to extend the notch/recess 20 shown in FIG. 9 over a specific circumferential portion (not shown). A such formed notch/recess 20 ensures the simultaneous engagement of the transport safeguard 52 and the lock safeguard 54, wherein the transport safeguard 52 and the lock safeguard 54 may be realized in only one common radial web or in two separate radial webs. The circumferentially extended recess/notch 20 provides a specific rotatory clearance between the adjusting element 30 and the basic element 10.

The transport safeguard 52 is preferably formed as springy web 52 protruding radially outwardly with respect to the outer edge of the threaded sleeve 40. For supporting the springy movability of the web 52 and thus its locking in the notch 20, the web 52 extends preferably in tangential direction with respect to the threaded sleeve 40 and opposite to the screw-in direction I. It is also preferred to arrange the web 52 extending tangential in screw-in direction I. The web 52 comprises further according to an embodiment a wavy protrusion directed in the direction of the basic element 10 which engages the respective notch 20. This wavy shape of the web 52 ensures that the web 52 may enter the notch 20 from both sides without problems, meaning at a clockwise rotation and at an anti-clockwise rotation of the adjusting element 30.

An embodiment of the lock safeguard 54 is shown in FIG. 9. The lock safeguard 54 is also a web protruding radially outwardly with respect to the threaded sleeve 14. The lock safeguard 54 is preferably arranged inclined in the direction of the basic element 10 so that the lock safeguard 54 encloses with the longitudinal axis L of the adjusting element 30 an angle <90°. Further, the lock safeguard 54 comprises a compression surface 55, the surface normal of which extends almost in tangential direction with respect to the threaded sleeve 40. When the adjusting element 30 is screwed into the basic element 10 and the lock safeguard 54 thus displaced in the direction of the recess 20, the compression surface 54 abuts at a specific angular position the surface 24. Thereby, a further screwing-in and locking of the adjusting element 20 in the basic element 10 is blocked. This blocking function is preferably ideally when the compression surface 52 and the surface 24 are arranged parallel to each other.

Further it should be considered that preferably the lock safeguard 54 is arranged in a radial plane which is spaced more from the disc 60 as the radial plane in which the transport safeguard 52 is arranged. In this manner, the lock safeguard 54 blocks effectively and reliably against a locking of adjusting element 30 and basic element 10 while simultaneously an easy releasable locking of the transport safeguard 52 in the chamber 20 is ensured.

From the above described construction of the fastening arrangement and its individual components results the following method for pre-assembly of the fastening arrangement for preparing the future installation of the fastening arrangement between the two components A and B. First of all, the adjusting element 30 is screwed into the basic element 10 (step A1). After the adjusting element 30 has been screwed deep enough into the basic element 10, the first anti-twist protection, especially the transport safeguard 52, of the adjusting element 30 locks or snaps into the first recess or notch 20 at the basic element 10 (step A2). As the adjusting element 30 may be screwed further into the basic element despite of the locking or snapping of the transport safeguard 52 into the notch 20, a blocking of the second anti-twist protection or lock safeguard 54, respectively, of the adjusting element 30 in a second recess or notch 20, respectively, at the basic element 10 follows after further screwing-in the adjusting element 30 into the basic element 10 so that the locking of adjusting element 30 and basic element 10 is prevented (step A3) (cf. the flowchart according to FIG. 13).

The compact and space-saving construction of the adjusting element 30 is based partly on the usage of the dragging-safeguard-component 50 (cf. FIGS. 10 to 12). Preferably, the dragging-safeguard-component 50 is punched as a straight extending part according to FIG. 11 from a springy metal and bended or curved. Preferably, the dragging-safeguard-component 50 according to FIG. 11 consists of spring steel while although other robust springy materials are suitable. The dragging-safeguard-component 60 is thus preferably present as punched and bended part made from spring steel.

For simplifying the manufacturing or production of the fastening arrangement, first of all the dragging-safeguard-component 50 according to FIG. 11 is punched and bended or curved. Thereafter, the open annular or toroidal shape of the dragging-safeguard-component 50 according to FIG. 12 is created. This dragging-safeguard-component 50 formed preferably with toroidal shape comprises the dragging arms 56 having a wavy shape with a radially inwardly directed protrusion (cf. FIG. 12). According to an embodiment, the dragging-safeguard-component 15 comprises at least one dragging arm 56 which is arranged in the inside of the threaded sleeve 40 after assembly. It is further preferred to arrange two or three dragging arms 56 in the threaded sleeve 40. In the installed state, the draggers 56 constrict the inner width of the threaded sleeve 40 so that its inner diameter is smaller than an outer diameter of the fastening screw 80.

Thereby, the fastening screw 80 turns or rotates the adjusting element as long as the adjusting element 30 abuts component B.

At the side facing the disc 60, the dragging-safeguard-component 50 comprises an open circumferential toroidal shaped strip 55 at which the dragging arms 56 and the anti-twist protections 52, 54 are fixed. The toroidal shaped strip 55 has a polygonal shape for simplifying its production and may thus be adapted to any arbitrary opening. Further, and by bending or curving the polygonal shape, it is prevented that the toroidal shaped strip 55 springs back, i.e. deforms back to the straight shape according to FIG. 11.

At the toroidal shaped strip 55, a circumferential toroidal collar 58 is arranged at the side facing away from the dragger. This toroidal collar 58 consists of equally spaced or radially outwardly protruding little flags, which will be hold in the future adjusting element 30 between the disc 60 and the threaded sleeve 40 in a clamping manner. The dragging-safeguard-component is fixed via the pressed sleeve 70 clamping the toroidal collar 55 between the disc 60 and threaded sleeve 40 as well as the toroidal shaped strip 55 between the pressed sleeve 70 and the inner wall of the threaded sleeve 40. From this, a stable and reliable arrangement of the dragging arms 56 as well as the anti-twist protections 52, 54 in the fastening arrangement results.

For mounting or assembling the fastening arrangement according to the invention between the two components A and B, the following steps are necessary. First of all, preferably the fastening arrangement consisting of adjusting element 30 and basic element 10 is transported to the customer. The transport safeguard 52 and the lock safeguard 54 take effect at this solely or commonly. At the customer, the basic element 10 is installed, assembled or fixed in component A (step B2), wherein the adjusting element 30 was released from the basic element 10 and thus also the transport safeguard 54 and/or the lock safeguard 54 previously (opt. B1). Thereafter, preferably the adjusting element 30 is installed again in the basic element 10 to be able to transport the whole arrangement to component B secured by the transport safeguard 52 and/or the lock safeguard 54.

In step B3, the fastening screw 80 is screwed into the basic element 10 via an opening in component B and via the adjusting element 30 installed in the basic element 10 so that tolerances between the components A and B are compensated automatically. Simultaneously, the transport safeguard 52 and/or the lock safeguard 54 are released at the beginning of this procedure (B1). In step B4, tightening of the fastening screw 80 in the basic element 10 takes place so that the components A and B are fixed at each other (cf. FIG. 14).

The invention claimed is:

1. Fastening arrangement for fastening a component B at a component A with automatic tolerance compensation between the components A and B comprising the following features:
   a basic element fixable at component A, wherein a fastening screw is screwable into the basic element via a first thread pairing,
   an adjusting element having an external thread, which is screwable into the basic element via a second thread pairing, wherein
   a first and a second anti-twist protection are provided between the basic element and the adjusting element by means of which a respective releasing of the adjusting element from the basic element during a transport and a locking of the adjusting element with the basic element is prevented, and the basic element of which comprises at a front surface facing the adjustment element at least one recess which is engageable by the first and/or the second anti-twist protection of the adjusting element, and the first anti-twist protection is a web arranged springy in axial direction of the adjusting element by which a locking connection with the basic element is creatable which is releasable by rotation.

2. Fastening arrangement according to claim 1, wherein the second anti-twist protection is a web protruding in radial direction of the adjusting element, which blocks a further screwing-in of the adjusting element into the basic element.

3. Fastening arrangement according to claim 2, the web of which has a compression surface having a normal oriented almost tangential with respect to the adjusting element by means of which a surface of at least one recess at the basic element may be abutted.

4. Fastening arrangement according to claim 1, the at least one recess of which extends over a rotation angle range so that the one recess is engageable by the first and second anti-twist protections at the same time.

5. Fastening arrangement according to claim 4, the recesses of which comprise a first and a second surface, respectively, which are arranged angularly and non-symmetrically with respect to each other.

6. Fastening arrangement according to claim 5, wherein the first surface of the recess is arranged in a larger angle as the second surface with respect to the longitudinal axis of the basic element.

7. Fastening arrangement according to claim 1, the at least one recess of which comprises a first and a second surface, respectively, which are arranged angularly and non-symmetrically with respect to each other.

8. Fastening arrangement according to claim 7, wherein the first surface of the recess is arranged in a larger angle as the second surface with respect to the longitudinal axis of the basic element.

9. Fastening arrangement according to claim 1, wherein the adjusting element is formed as one-part or as multi-part component and which comprises a central dragging-safeguard-component.

10. Fastening arrangement according to claim 9, wherein the central dragging-safeguard-component is formed in a toroidal shape having at least one radially inwardly protruding dragging arm as well as the first and second anti-twist protections which protrude radially outwardly.

11. Fastening arrangement according to claim 9, wherein the adjusting element comprises a threaded sleeve and a disc, wherein the dragging-safeguard-component is fixed between the disc and the threaded sleeve by means of a fastening sleeve.

12. Fastening arrangement according to claim 1, wherein the adjusting element is formed as one-part component and which comprises a central dragging-safeguard-component and wherein the adjusting element is produced as a one piece plastic component.

13. A connection between component A and component B which has been produced by means of the fastening arrangement according to claim 1 in combination with a fastening screw.

14. A method for pre-assembly of the fastening arrangement according to claim 1, comprising the following steps:
   screwing-in (A1) of the adjusting element into the basic element,
   locking (A2) of the first anti-twist protection of the adjusting element in a first recess at the basic element and
   blocking (A3) of the second anti-twist protection of the adjusting element in a second recess at the basic element so that a locking of the adjusting element and the basic element is prevented.

15. Method for assembly of the fastening arrangement according to claim 1, comprising the following steps:
   releasing (B1) at least the first and/or the second anti-twist protection between basic element and adjusting element,
   fixing (B2) the basic element at component A,
   screwing-in (B3) of the fastening screw through an opening in component B and through the adjusting element installed in the basic element into the basic element so that tolerances between the components A and B are compensated automatically and wherein a releasing (B1) of at least the first and/or second anti-twist protection takes place between the basic element and the adjusting element, and
   screwing (B4) the fastening screw tightly into the basic element so that the components A and B are fixed at each other.

16. Fastening arrangement according to claim 1, wherein the second anti-twist protection is a web protruding in radial direction of the adjusting element, which blocks a further screwing-in of the adjusting element into the basic element.

17. Fastening arrangement according to claim 16, the web of which has a compression surface having a normal oriented almost tangential with respect to the adjusting element by means of which a surface of at least one recess at the basic element may be abutted.

* * * * *